(12) United States Patent
Schreck

(10) Patent No.: US 7,123,435 B1
(45) Date of Patent: Oct. 17, 2006

(54) METHOD AND APPARATUS FOR OVERWRITING DATA IN A DISK DRIVE

(75) Inventor: Erhard T. Schreck, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/145,565

(22) Filed: Jun. 3, 2005

Related U.S. Application Data

(60) Provisional application No. 60/576,857, filed on Jun. 3, 2004.

(51) Int. Cl.
 G11B 5/596 (2006.01)
 G11B 21/02 (2006.01)

(52) U.S. Cl. .................... 360/78.08; 360/75

(58) Field of Classification Search ............ None
 See application file for complete search history.

(56) References Cited

U.S. PATENT DOCUMENTS

2002/0114239 A1\* 8/2002 Yokokawa ............ 369/53.22

\* cited by examiner

*Primary Examiner*—Hoa T. Nguyen
*Assistant Examiner*—Mitchell Slavitt
(74) *Attorney, Agent, or Firm*—Tejpal S. Hansra

(57) ABSTRACT

A method and apparatus for overwriting data in a disk drive is provided. In one embodiment, a disk drive includes a disk surface and a write head associated therewith. The disk surface has servo information and user data written thereon. The user data is written by the write head. User data is overwritten by sweeping the write head from a first radius on the disk surface to a second radius on the disk surface, while the write head is actively writing.

24 Claims, 5 Drawing Sheets

METHOD AND APPARATUS FOR OVERWRITING DATA IN A DISK DRIVE

CROSS-REFERENCE TO RELATED APPLICATION

Priority is claimed from U.S. Provisional Patent Application Ser. No. 60/576,857 filed Jun. 3, 2004 and entitled "Fast Drive Internal Spiral Data Erase," which is incorporated by reference herein in its entirety.

FIELD OF THE INVENTION

The present invention relates to hard disk drives (referred to herein as "disk drives"). More particularly, the present invention relates to a method and apparatus for overwriting data in a disk drive, so that the likelihood of confidential data being read from the disk drive is reduced.

BACKGROUND OF THE INVENTION

FIG. 1 illustrates a conventional disk drive system 100 in block diagram form. The disk drive system 100 is operative for performing data storage and retrieval functions for an external host computer 102. The disk drive system 100 includes: a disk 104, a transducer 106, an actuator assembly 108, a voice coil motor (VCM) 110, a read/write channel 112, an encoder/decoder (ENDEC) 114, an error correction coding (ECC) unit 116, a data buffer memory 118, an interface unit 120, a servo unit 122, and a disk controller/microprocessor 124.

In general, disk 104 includes a pair of disk surfaces (a disk surface 242 is shown in FIG. 2) which are coated with a magnetic material that is capable of changing its magnetic orientation in response to an applied magnetic field. Data is stored digitally in the form of magnetic polarity transitions (frequently referred to as pulses) within concentric tracks on one or more of the disk surfaces. The disk 104 is rotated at a substantially constant spin rate by a spin motor (not shown) that is speed-controlled by a closed-loop feedback system. Instead of the single disk 104 shown in FIG. 1, the disk drive system 100 can include a plurality of disks all mounted on a single spindle and each serviced by one or more separate transducers.

The transducer 106 is a device that transfers information from/to the disk 104 during read and write operations. The transducer 106 is positioned over the disk 104, typically, by a rotary actuator assembly 108 that pivots about an axis under the power of the VCM 110. During a write operation, a polarity-switchable write current is delivered to the transducer 106 from the read/write channel 112 to induce magnetic polarity transitions onto a desired track of the disk 104. During a read operation, the transducer 106 senses magnetic polarity transitions on a desired track of the disk 104 to create an analog read signal that is indicative of the data stored thereon. Commonly, the transducer 106 is a dual element head having a magnetoresistive read element (or giant magnetoresistive read element) and an inductive write element.

The VCM 110 receives movement commands from the servo unit 122 for properly positioning the transducer 106 above a desired track of the disk 104 during read and write operations. The servo unit 122 is part of a feedback loop that uses servo information from the surface of the disk 104 to control the movement of the transducer 106 and the actuator assembly 108 in response to commands from the controller/microprocessor 124.

During a read operation, the channel 112 receives the analog read signal from the transducer 106 and processes the signal to create a digital read signal representative of the data stored on the disk 104. Typically, detection circuitry is included in the channel 112. The channel 112 may also include means for deriving timing information, such as a read clock, from the analog signal.

The ENDEC 114 is operative for: (1) encoding data being transferred from the host 102 to the disk 104, and (2) decoding data being transferred from the disk 104 to the host 102. Data being written to the disk 104 is encoded for a number of reasons, including those relating to timing and detection concerns. The ENDEC generally imparts a run length limited (RLL) code on the data being written to the disk 104 to ensure that the frequency of transitions in the bit stream does not exceed or fall below predetermined limits. Such coding ensures that, among other things, enough transitions exist in the read data to maintain an accurate read clock. Other coding schemes may also be employed in the ENDEC 114.

The ECC unit 116 is operative for adding redundant information to the data from the host 102 before that data is encoded in the ENDEC 114 and written to the disk 104. This redundant information is used during subsequent read operations to permit discovery of error locations and values within the decoded read data. Errors in the read data detected by the ECC unit 116 can result from any number of mechanisms, such as: (1) media noise due to media anomalies, (2) random noise from the transducer, cabling and electronics, (3) poor transducer placement, which reduces signal amplitude and/or increases adjacent track noise during the read operation, (4) poorly written data due to media defects or poor transducer placement, and/or (5) foreign matter on the media or media damage. ECC units are generally capable of correcting up to a predetermined number of errors in a data block. If more than the predetermined number of errors exist, then the code will not be able to correct the errors but may still be able to identify that errors exist within the block. ECC functionality is generally implemented in a combination of hardware and software.

The data buffer memory 118 is used to temporarily store data for several purposes: (1) to permit data rates that are different between the disk drive and the host interface bus, (2) to allow time for the ECC system to correct data errors before data is sent to the host 102, (3) temporary parameter storage for the controller/microprocessor 124, and (4) for data caching.

The interface 120 is used to establish and maintain communication between the host 102 and the disk drive system 100. In this regard, all information is transferred into and out of the disk drive 100 through the interface 120.

The disk controller/microprocessor 124 is operative for controlling the operation and timing of the other elements of the system 100. In addition, the controller/microprocessor 124 may perform the functions of some of the elements of the system. For example, the controller/microprocessor 124 may perform the correction computation function of the ECC unit 116 if errors exceed the capability of the hardware based unit.

FIG. 2 is a diagrammatic representation of a simplified top view of a disk 104 having a surface 242 which has been formatted to be used in conjunction with a conventional sectored servo system (also known as an embedded servo system), as will be understood by those skilled in the art. As illustrated in FIG. 2, the disk 104 includes a plurality of concentric tracks 244a–244h for storing data on the disk's surface 242. Although FIG. 2 only shows a relatively small number of tracks (i.e., 8) for ease of illustration, it should be appreciated that typically many thousands of tracks are included on the surface 242 of a disk 104.

Each track 244a–244h is divided into a plurality of data sectors 246 and a plurality of servo sectors 248. The servo sectors 248 in each track are radially aligned with servo sectors 248 in the other tracks, thereby forming servo wedges 250 which extend radially across the disk 104 (e.g., from the disk's inner diameter 252 to its outer diameter 254). The servo sectors 248 are used to position the transducer 106 associated with each disk 104 during operation of the disk drive 100. The data sectors 246 are used to store customer data, which is provided by the host computer 102.

As mentioned above, all information is transferred into and out of the disk drive 100 to the host 102 via interface 120. As depicted in FIG. 3, conventionally, data is transferred from the host computer 102 to the disk drive 100 in fixed data sizes known as host blocks 300. Typically, a host block 300 ranges in length from 128 bytes to 4096 bytes, with 512 bytes being most common.

With reference to FIG. 4, conventionally, data is stored onto the surface 242 of disk 104 in fixed data sizes known as disk blocks 400. As shown in FIG. 4, each disk block 400 may have an error correction (ECC) field 402 associated with it. Furthermore, in order to store and retrieve a disk block 400 onto the disk surface 242, a pre-data field 404 and a post-data field 406 are typically provided for each disk block 400. The combined pre-data field 404, disk block 400, ECC field 402 and post-data field 406 comprise a disk sector 408, which is stored on the disk surface 242 in a data sector 246.

There may be many disk sectors 408 in each data sector 246. Generally, there are more disk sectors 408 in tracks near the outer diameter of the disk surface as compared to tracks near the inner diameter of the disk surface.

Because each disk sector 408 may be identified by a unique logical block address (LBA), commonly disk sectors are referred to as LBAs. FIG. 5 is a simplified diagrammatic representation of a portion of a disk surface 542 in linear rather than arcuate form.

FIG. 5 shows a plurality of tracks (Track N to Track N+6 are shown), wherein each track extends horizontally across the page (i.e., in the disk's circumferential direction). Each track also includes servo sectors (servo sectors 548a and 548b are shown), which extend vertically along the page (i.e., in the disk's radial direction), and data sectors (only one data sector 546 is shown).

Within each data sector along a track, a plurality of LBAs 560 are provided. Typically, the LBAs 560 are slightly separated from one other along a track (i.e., in a circumferential direction). Furthermore, LBAs 560 are also typically separated from one another in a radial direction.

It should be understood that FIG. 5 is an extreme simplification and is being used in order to more easily illustrate the present invention. Those skilled in the art will understand that LBAs from track-to-track (i.e., in a radial direction) are not necessarily aligned with one another. Furthermore, LBAs in a circumferential direction may be split by servo sectors 548, such that a first portion of an LBA may appear on a first side of a servo sector and a second portion of an LBA may appear on a second side of the servo sector.

Those skilled in the art also understand that there are a number of types of interfaces that may be employed for communicating data between the host computer 102 and the disk drive 100. These interfaces may include, for example, an advanced technology attachment (ATA) interface (also known as an integrated device electronics (IDE) interface), small computer system interface (SCSI), a fibre channel (FC) interface, a gigabit interconnect (GBIC) interface and a peripheral component interconnect (PCI) interface, among others. The length of the host block 300 (and, hence LBA) is determined by the particular interface that is used.

In some interfaces, the size of the host block 300 is fixed. For, example, IDE interfaces require the host block 300 to have a length of 512 bytes. Other interfaces, however, (e.g., SCSI and FC interface) support host blocks 300 having variable lengths. In such interfaces, the length of the host block 300 may be programmed by a user.

Computer disk drive users often store confidential information on their disk drives. For example, home-based users may store tax information including social security numbers, bank account numbers, and the like on their disk drives. Furthermore, in a business environment, confidential business files may also be stored on disk drives.

For obvious reasons, when disk drives are to be disposed of or are to be reused, it is important to "erase" or "wipe-out" (more properly, "overwrite") confidential information therefrom. However, many users don't take any steps to overwrite any of the information stored in their disk drives prior to disposing of their disk drives or making disk drives available for reuse. Accordingly, the confidential data stored on their disk drives is at risk.

One prior technique is to overwrite the file allocation tables associated with each disk surface, without overwriting the user data in the LBAs 560. However, software programs are available which allow user data to be read on an LBA-by-LBA basis. Accordingly, such prior technique still leaves confidential user data at risk.

In another prior technique, a software program is used to overwrite each and every LBA 560 with non-confidential data (e.g., using random data patterns or predetermined data patterns). However, the processes associated with software program are quite time-consuming.

More specifically, LBAs 560 along a particular track are overwritten (i.e., in a circumferential direction). Then, after moving to a next track (or fraction of a track), LBAs along the next track (or fraction of a track) are overwritten. This process is repeated until substantially all LBAs containing user data have been overwritten. Importantly, no writing is performed while the transducer is moving from a first track to a second track. Instead, writing is only performed after the transducer has settled on a track.

Accordingly, as the number of tracks per inch (TPI) continues to increase and as the number of bits per inch (BPI) continues to increase, the amount of time necessary to overwrite each LBA on a disk surface will continue to increase. Among other things, this may further discourage users to overwrite confidential information on their disk drives.

Therefore, it would be desirable to develop relatively fast technique for overwriting user data in a disk drive. By providing a fast technique for overwriting user data in a disk drive, users may be encouraged to overwrite confidential information stored on their disk drives, thereby reducing the likelihood of such confidential data being compromised.

SUMMARY OF THE INVENTION

The present invention is designed to reduce the aforementioned problems and meet the aforementioned, and other, needs.

A method and apparatus for overwriting user data in a disk drive is disclosed. Instead of overwriting user data in a circumferential direction on an LBA-by-LBA basis, user data is overwritten in a spiral fashion.

In one embodiment, a disk drive includes a disk surface and a write head associated therewith. The disk surface has servo information and user data written thereon. The user data is written by the write head. User data is overwritten by sweeping the write head from a first radius on the disk surface to a second radius on the disk surface, while the write head is actively writing.

In one embodiment, servo information is overwritten by the write head. In another embodiment, information stored in a utility zone is overwritten by the write head. In yet another embodiment, the write head is swept at velocity that is adjustable. In a further embodiment, the velocity is selected to overwrite at least a predetermined percentage of a logical block address that includes user data.

Other objects, features, embodiments and advantages of the invention will be apparent from the following specification taken in conjunction with the following drawings.

DETAILED DESCRIPTION OF THE PREFERRED EMBODIMENT

Figure 1:
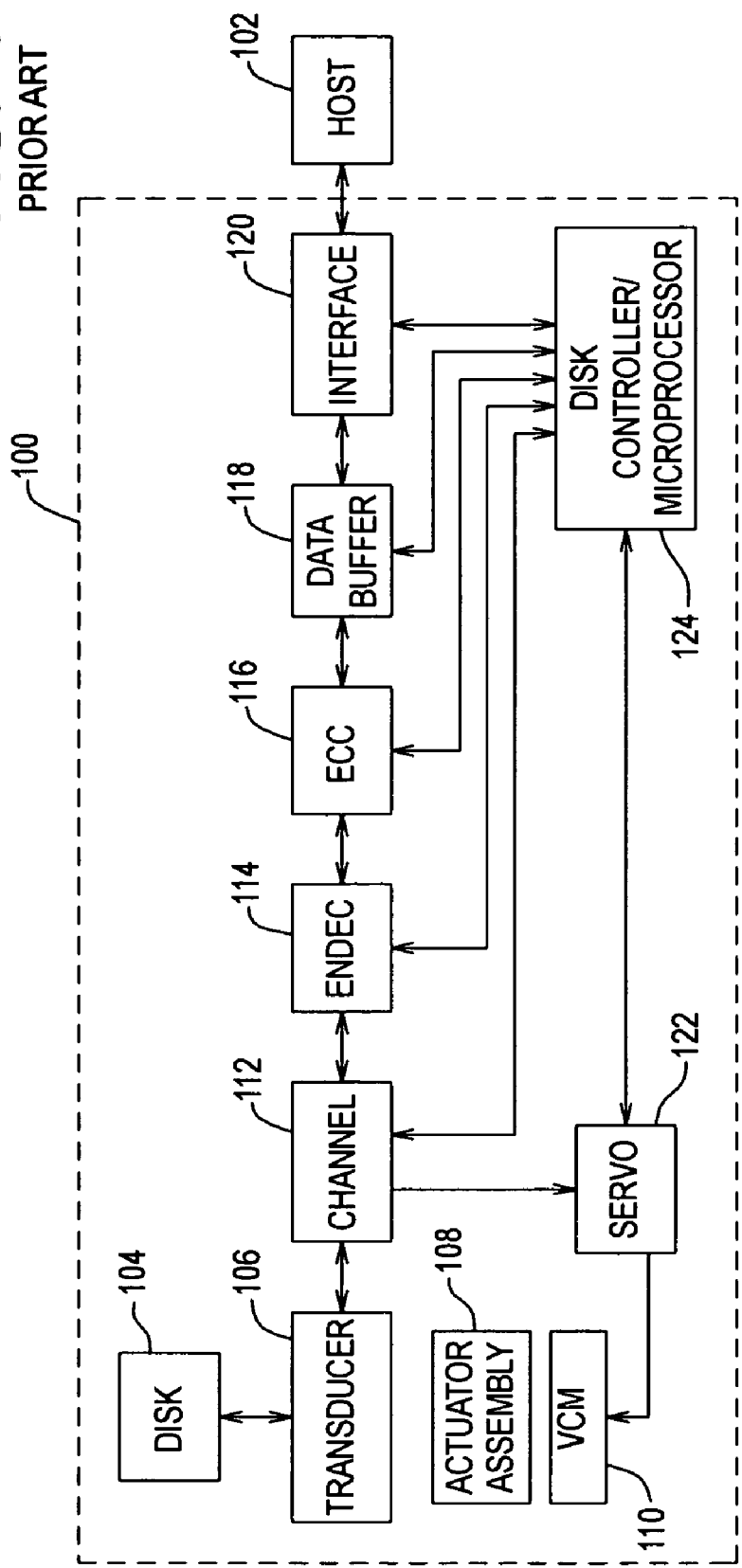
FIG. 1 is a block diagram showing certain functional components of a conventional disk drive, wherein the disk drive is coupled to a host computer.
Figure 2:
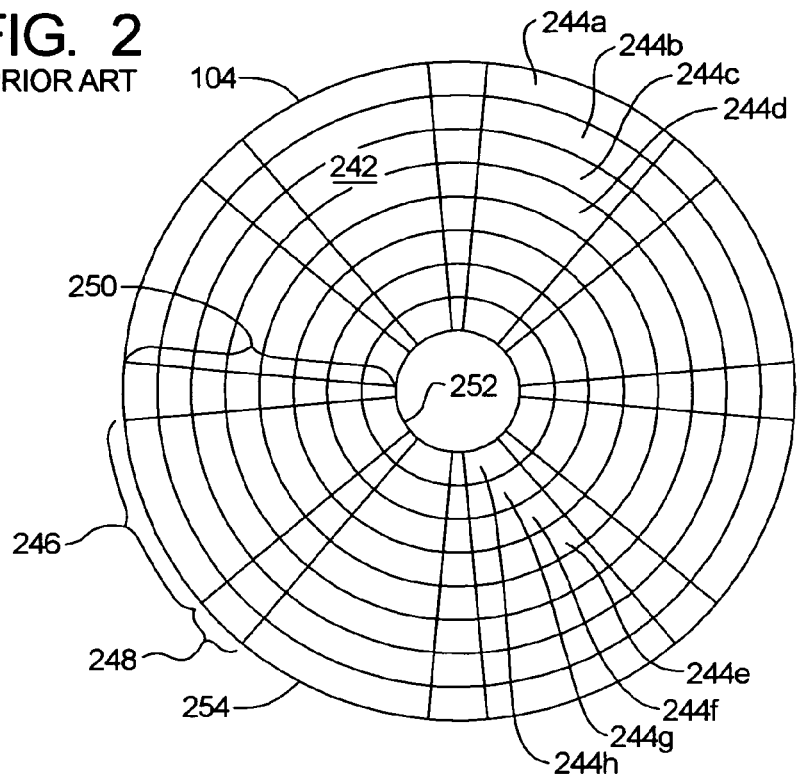
FIG. 2 is a diagrammatic representation of a simplified top view of a disk having a surface which has been formatted to be used in conjunction with a conventional sectored servo system.
Figure 3:
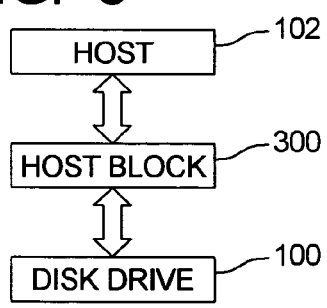
FIG. 3 is a block diagram showing that data is communicated between a host computer and a disk drive in host blocks having a predetermined length.
Figure 4:
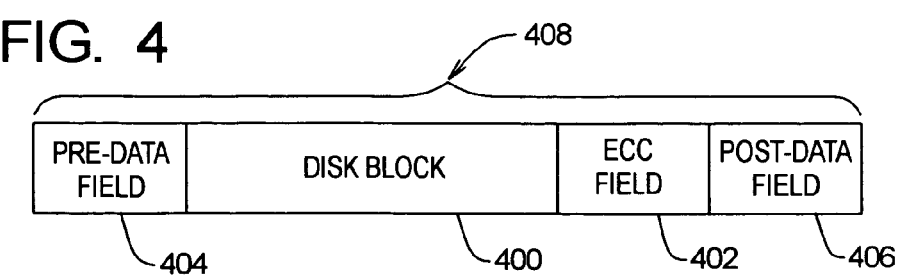
FIG. 4 is a block diagram of a disk sector comprised of a pre-data field, a disk block, an ECC field and a post-data field.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 6:
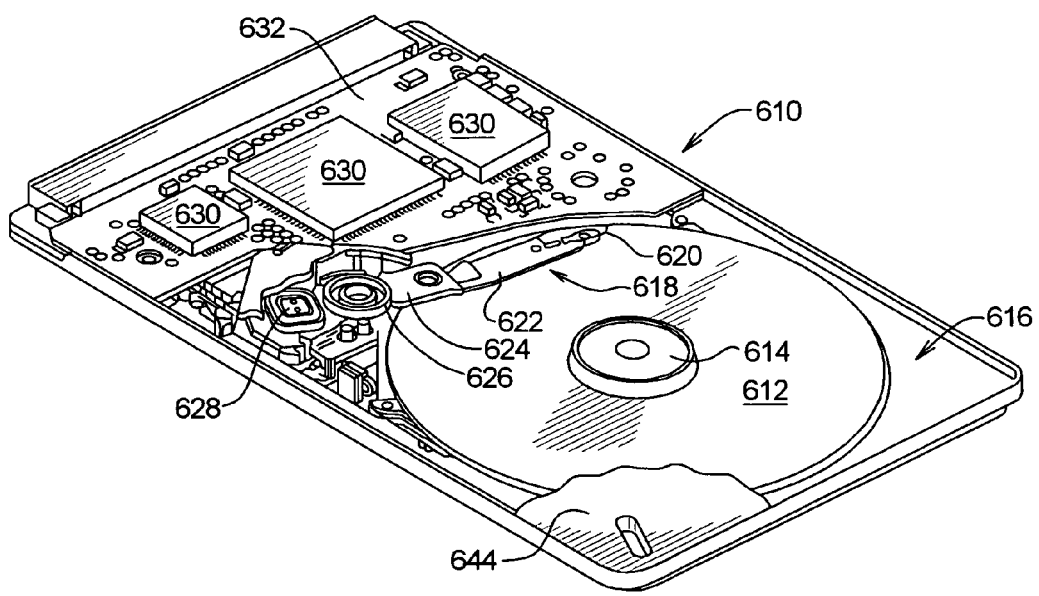
FIG. 6 is a simplified diagrammatic representation of a disk drive, with its top cover removed, that may be used in conjunction with the present invention.

FIG. 6 is a diagrammatic representation illustrating a disk drive, generally designated 610, with which the present invention may be used. The disk drive 610 includes a disk 612 that is rotated by a spin motor 614. The spin motor 614 is mounted to a base plate 616. An actuator arm assembly 618 is also mounted to the base plate 616.

The actuator arm assembly 618 includes a transducer 620 mounted to a flexure arm 622 which is attached to an actuator arm 624 that can rotate about a bearing assembly 626. The actuator arm assembly 618 cooperates with a voice coil motor 628 which moves the transducer 620 relative to the disk 612. The spin motor 614, voice coil motor 628 and transducer 620 are coupled to a number of electronic circuits 630 mounted to a printed circuit board 632. The electronic circuits 630 include a read channel chip, a microprocessor-based controller and a random access memory (RAM) device.

The disk drive 610 may include a plurality of disks 612 and, therefore, a plurality of corresponding actuator arm assemblies 618. However, it is also possible for the disk drive 610 to include a single disk 612 as shown in FIG. 6.

Figure 7:
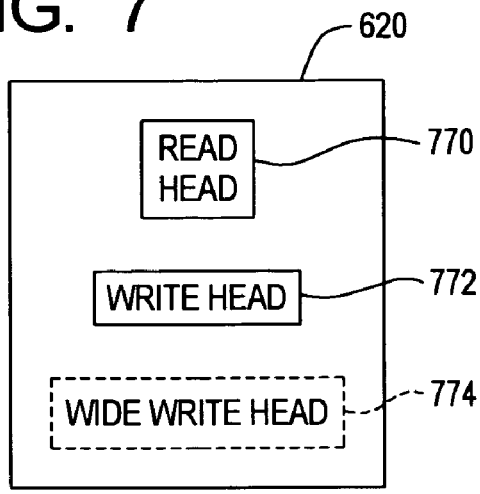
FIG. 7 is a simplified diagrammatic representation of a transducer that includes a read head, a write head and an optional wide write head for use in conjunction with one embodiment of the present invention.

FIG. 7 is a simplified diagrammatic representation of a transducer 620, which includes a read head 770 and a write head 772. In one embodiment, the transducer 620 includes an optional second write head (termed a wide write head 774), wherein the width of the wide write head 774 is wider than the width of the write head 772. The optional use of the wide write head 774 will be discussed in further detail after explaining the basic features of the present invention.

Figure 5:
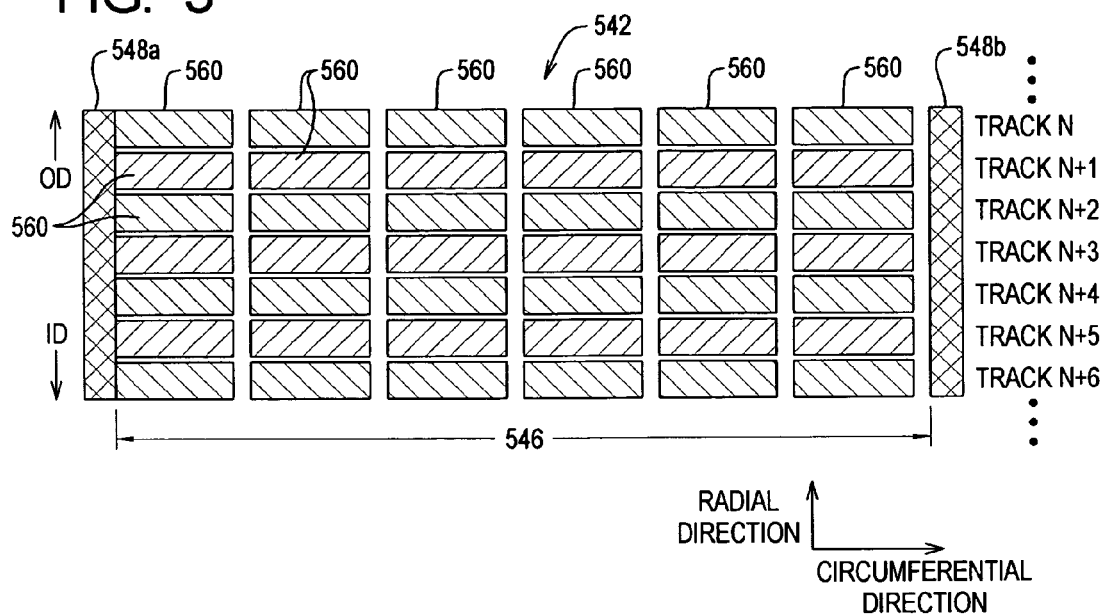
FIG. 5 is a simplified diagrammatic representation of a portion of a disk surface showing a plurality of tracks each including servo sectors and a plurality of LBAs.
Figure 8:
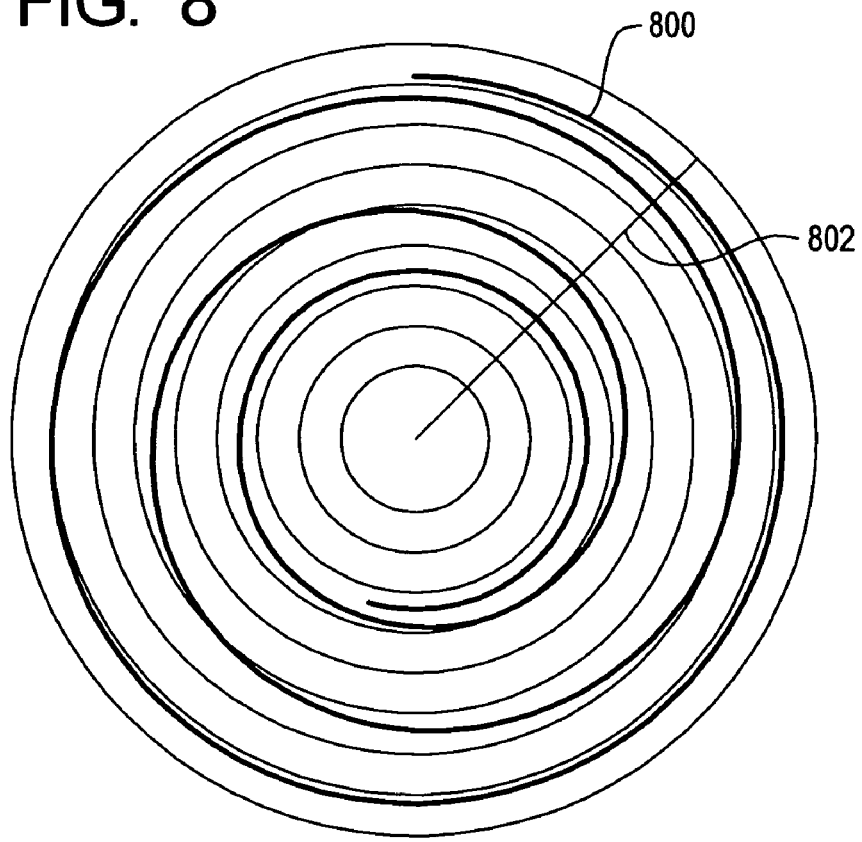
FIG. 8 is a simplified diagrammatic representation of a portion of an exemplary spiral written onto a disk surface.
Figure 9:
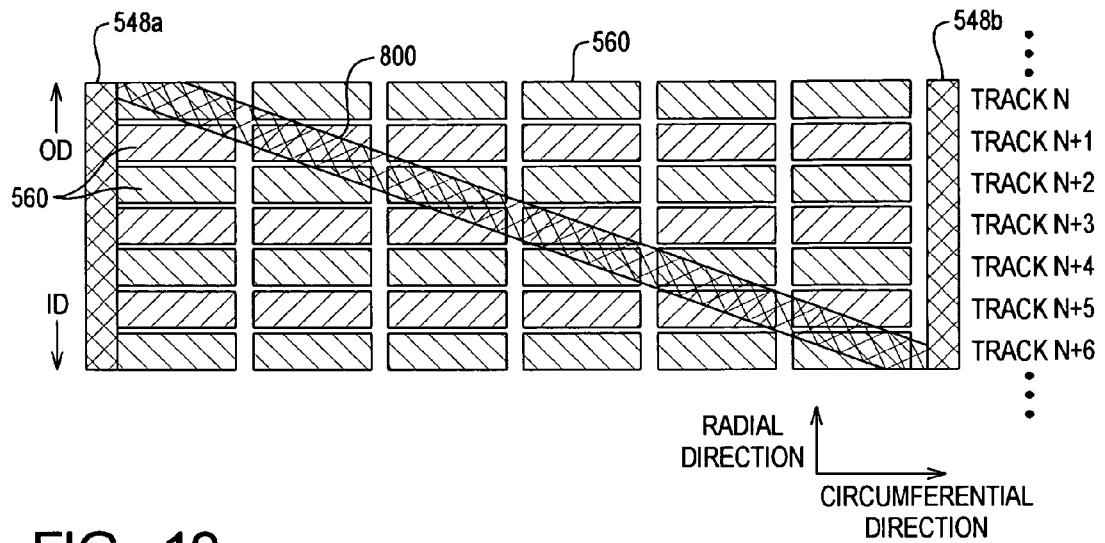
FIG. 9 is a simplified diagrammatic representation, similar to that shown in FIG. 5, showing data being overwritten in a spiral fashion in accordance with one embodiment of the present invention.

FIG. 8 is a simplified diagrammatic representation of a disk surface showing a portion of an exemplary spiral written thereon. FIG. 9 is a simplified diagrammatic representation of a portion of a disk surface, similar to that shown in FIG. 5. Like FIG. 5, the disk surface includes LBAs 560 that include user data.

With reference to FIGS. 8 and 9, instead of overwriting user data with the write head 772 in a circumferential direction along a track, user data is overwritten with the write head 772 in a spiral fashion as indicated by write pattern 800. More specifically, while the write head 772 is swept from a first radius (e.g., a first track such as Track N) to a second radius (e.g., a second track such as Track N+6), the write head is active and overwrites user data as the disk is spinning.

As shown in FIG. 9, each LBA is not necessarily overwritten completely. Instead, the inventor of the present invention has recognized that user data can be partially overwritten such that it becomes somewhat difficult for a casual computer user to read back such partially-overwritten data. The inventor has also recognized that the amount of user data that must be overwritten (e.g., in each LBA) is dependent upon the ability of the ECC to correct for errors. Even further, the inventor has recognized that amount of user data that is overwritten by the write head (at each pass) can be adjusted based upon the write head's velocity as it is being swept across the disk surface.

A plurality of sweeps of the write head across the disk surface while the write head is active (e.g., a plurality of spirals) may be used to overwrite additional user data. In one embodiment, during the plurality of sweeps, the write head is active only while traveling in a direction from a first radius near the outer diameter of the disk surface to a second radius near the inner diameter of the disk surface. Thus, during its return, from the second radius to the first radius, the write head is not active.

In another embodiment, during the plurality of sweeps, the write head is active only while traveling in a direction from a second radius near the inner diameter of the disk surface to a first radius is near the outer diameter of the disk surface. Thus, during its return from the first radius to the second radius, the write head is not active.

In yet another embodiment, during the plurality of sweeps, the write head is active in both directions when moving between a first radius near the outer diameter of the disk surface and a second radius near the inner diameter of the disk surface.

Because the number of LBAs on a track near the outer diameter of the disk surface are typically greater than the number of LBAs on a track near the inner diameter of the disk surface, in one embodiment, the number of spiral overwrite patterns written by the write head is equal to the number of LBAs on the outermost track that contains user data. In such embodiment, each spiral overwrite pattern is coordinated to start (or end) with each LBA of the outermost track that contains user data.

Of course, the number of spiral overwrite patterns may be greater than the number of LBAs on the outermost track that contains user data. Furthermore, the number of spiral overwrite patterns may also be less than the number of LBAs on the outermost track that contains user data.

In one embodiment, instead of just overwriting user data, servo information may also be overwritten. Overwriting servo information will generally make it more difficult for someone to recover data from a disk surface of a disk drive. Thus, it may be especially beneficial to overwrite servo information when it is known that a disk drive is to be discarded or otherwise taken out of service.

In one embodiment, user data is overwritten prior to any servo information being overwritten. For example, a plurality of spiral overwrite patterns may be used to overwrite user data. Once user data has been overwritten, then servo information is overwritten using a plurality of spiral overwrite patterns. In another embodiment, both user data and servo information are overwritten using common spiral overwrite patterns.

In one embodiment, the velocity of the write head (as it is being swept across the disk surface) is limited to a maximum velocity, so that at least a predetermined percentage of user data (e.g., at a particular LBA) is overwritten by the write head (e.g., 10 percent or 20 percent of an LBA). In one embodiment, the velocity of the write head is adjustable (e.g., to a velocity less than the maximum velocity), so as to allow a variety of levels of overwriting quality.

In one embodiment, the write head follows predetermined velocity profiles as it is being swept across the disk surface, wherein the predetermined velocity profiles are stored in the disk drive's memory. For example, as can be seen in FIG. 8, the exemplary spiral overwrite pattern 800 was written using a velocity profile having a velocity that varied across portions of the disk surface, since the distances between the spiral overwrite pattern along radial line 802 are not equal. It should be understood that FIG. 8 only illustrates an example spiral overwrite pattern and that the velocity profile of the write head may be different from that shown in FIG. 8. In one embodiment, the velocity profile of the write head is constant over at least a portion of the disk surface.

The data overwrite process of the present invention may be entered using a number of different techniques. In one embodiment, when the disk drive is communicating with a host computer, a user may be allowed to issue a command via the host computer's operating system.

Figure 10:
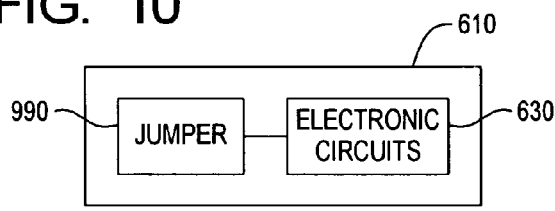
FIG. 10 is a simplified diagrammatic representation of a disk drive that includes a jumper coupled to electronic circuits in accordance with one embodiment of the present invention; and, FIG. 11 is a simplified diagrammatic representation of a disk surface having a utility area.

In another embodiment, as depicted in FIG. 10, a special jumper 990 (or switch) is provided on the disk drive 610. The jumper 990 communicates with the electronic circuits 630, such that when the jumper is set, the data overwrite process of the present invention is activated.

In operation, first, the drive 610 is turned off. Next, the jumper 990 is set. Then, the drive 610 is turned on and enters the data overwrite mode.

Figure 11:
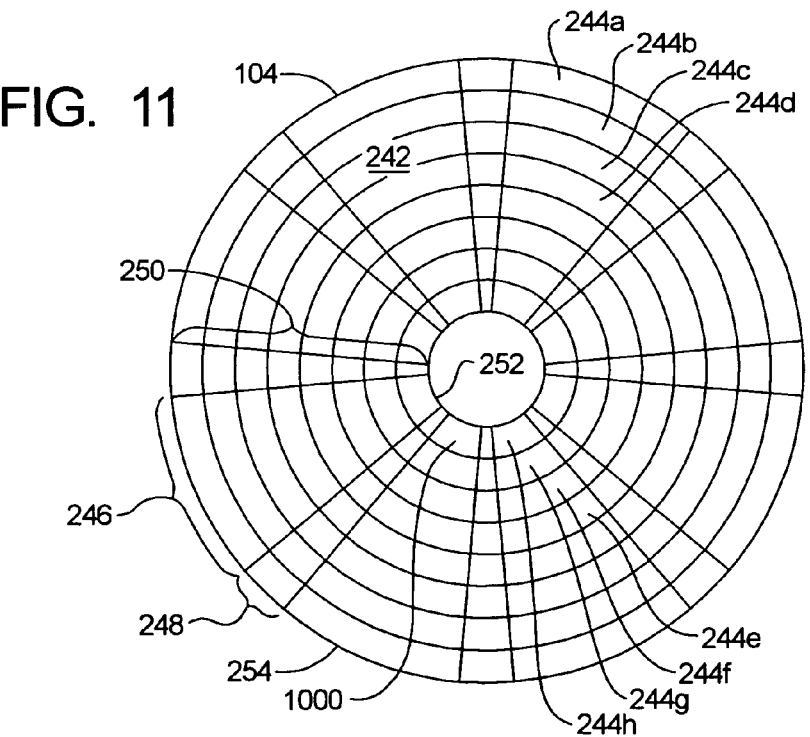

Regardless of the manner in which the overwrite process is activated, in one embodiment, a safeguard is provided to address situations where the disk drive loses power during the overwrite process. Specifically, the write head writes information in the utility area (e.g., in a sector like sector 1000 shown FIG. 11, or in a track or group of tracks) of the disk surface when power is interrupted, as will be understood by those skilled in the art. In one embodiment, the utility area (which may include a sector, a track or a group of tracks) is not overwritten in the overwrite process. The information written in the utility area indicates the progress of the overwrite process prior to the interruption, so that the overwrite process may continue where it left off. The information may include, for example, the number of spirals that have been written or other relevant information. Storing information in the utility area can prevent situations where one thinks that the data overwrite process is complete, but in fact it is not.

In another embodiment, the utility area is overwritten. Preferably, the utility area is the last area to be overwritten. Accordingly, in one embodiment, the utility area is overwritten in a circumferential manner, rather than in a spiral manner. In yet another embodiment, the utility area is overwritten in a spiral manner.

In another embodiment, a wide write head 774 (see FIG. 7) may be used to overwrite user data. The wide write head 774 is wider than write head 772. Accordingly, when the wide write head 774 actively writes while being swept across the disk surface, more data will be overwritten as compared to write head 772.

In one embodiment, the wide write head 774 is only used for overwriting data. Accordingly, the wide write head 774 is not a high-efficiency writer. That is, it is of lower quality than the write head 772.

In one embodiment, spiral overwrite patterns are written on all disk surfaces simultaneously. That is, write heads are energized simultaneously, so that they perform a "bulk overwrite," as opposed to write heads being energized sequentially.

In another embodiment, spiral overwrite patterns are written on groups of disk surfaces simultaneously. For example, in a disk drive with eight disk surfaces, a first group of four disk surfaces will be overwritten simultaneously, then a second group of four disk surfaces will be overwritten simultaneously. Overwriting in groups may be necessary if the disk drive's preamplifier cannot supply enough current to all of the write heads at the same time, as will be understood to those skilled in the art.

Advantageously, the present invention may be implemented in the disk drive's firmware or software.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising:
providing a disk surface having servo information and user data written thereon, said user data being written by a write head associated with the disk surface;
sweeping the write head from a first radius to a second radius on the disk surface while the write head is actively writing to overwrite user data.

2. The method of claim 1 wherein the write head also overwrites servo information.

3. The method of claim 1 wherein the first radius is near an outer diameter of the disk surface and wherein the second radius is near an inner diameter of the disk surface.

4. The method of claim 1 wherein the disk surface is spinning under the write head.

5. The method of claim 1 wherein the write head overwrites user data on the disk surface in substantially a spiral pattern.

6. The method of claim 1 wherein the write head is swept at an adjustable velocity.

7. The method of claim 6 wherein the velocity is adjusted to overwrite at least a predetermined percentage of a logical block address on the disk surface.

8. The method of claim 7 wherein, after the predetermined percentage of the logical block address has been overwritten, original information stored in the logical block address cannot be recovered using error correction code.

9. The method of claim 1 wherein an outermost radius that has user data stored thereon has a number of logical block addresses given by the value N and wherein at least N sweeps are made across the disk surface by the write head to overwrite user data.

10. The method of claim 9 wherein the Nth sweep is started at the Nth logical block address.

11. The method of claim 1 wherein the write head is active from an outer diameter to an inner diameter and active when returning from the inner diameter to the outer diameter.

12. The method of claim 1 wherein servo information is not overwritten.

13. The method of claim 1 wherein the write head overwrites user data when traveling in a first direction, but does not overwrite user data when traveling in a second direction opposite to the first direction.

14. The method of claim 1 wherein the write head overwrites user data when traveling in a first direction, and overwrites user data when traveling in a second direction opposite to the first direction.

15. The method of claim 1 further including the steps of:
sweeping the write head over the disk surface multiple times while the write head is actively writing in order to overwrite user data; and,
after overwriting the user data, sweeping the write head over the disk surface multiple times while the write head is actively writing in order to overwrite servo information.

16. The method of claim 15 further including the step of:
overwriting data stored on the disk surface in a utility area after the user data has been overwritten.

17. The method of claim 1, wherein the disk surface is included in a disk drive and wherein the disk drive is in communication with a host computer, further including the step of:
initiating the step of sweeping via a command communicated between the host computer and the disk drive.

18. The method of claim 1, wherein the disk surface is included in a disk drive having a jumper that may be set, further including the step of:
initiating the step of sweeping by setting the jumper.

19. The method of claim 18 further including the step of:
turning off the disk drive prior to setting the jumper.

20. The method of claim 19 wherein the step of sweeping is initiated after the disk drive is turned on.

21. The method of claim 1 further including the steps of:
sweeping the write head over the disk surface multiple times while the write head is actively writing in order to overwrite user data; and,
upon a power failure, storing status information regarding the overwriting of user data in a utility area on the disk surface.

22. A method comprising:
providing a plurality of disk surfaces having servo information and user data written thereon, each of the plurality of disk surfaces having a write head associated therewith;
sweeping the write heads from a first radius to a second radius relative to the disk surfaces while the write heads are actively writing, so that user data is simultaneously overwritten by the write heads.

23. A method comprising:
providing a disk surface having servo information and user data written thereon, said disk surface having a first write head and a second write head associated therewith, said user data being written by said first write head;
sweeping the second write head from a first radius to a second radius on the disk surface while the second write head is actively writing to overwrite user data.

24. The method of claim 23 wherein the first write head has a width and the second write head has a width, and wherein the width of the second write head is greater than the width of the first write head.

* * * * *